United States Patent
Wang et al.

(10) Patent No.: US 7,826,963 B1
(45) Date of Patent: Nov. 2, 2010

(54) DIAGNOSTIC SYSTEM FOR SPARK IGNITION DIRECT INJECTION SYSTEM CONTROL CIRCUITS

(75) Inventors: Wenbo Wang, Novi, MI (US); Mark D. Carr, Fenton, MI (US); Michael J. Lucido, Northville, MI (US); Jon C. Miller, Fenton, MI (US); John F. Van Gilder, Webberville, MI (US); Daniel P. Grenn, Highland, MI (US); Hamid M. Esfahan, Ann Arbor, MI (US); Ian J. Mac Ewen, White Lake, MI (US)

(73) Assignee: GM Global Technology Operations, Inc.

( * ) Notice: Subject to any disclaimer, the term of this patent is extended or adjusted under 35 U.S.C. 154(b) by 14 days.

(21) Appl. No.: 12/431,153

(22) Filed: Apr. 28, 2009

(51) Int. Cl.
*F02M 51/00* (2006.01)

(52) U.S. Cl. .............. 701/114; 123/479; 123/490; 123/690; 73/114.41; 73/114.45

(58) Field of Classification Search .............. 701/114; 123/490, 690, 479; 73/114.41, 114.45
See application file for complete search history.

(56) References Cited

U.S. PATENT DOCUMENTS

| 4,932,246 | A  * | 6/1990 | Deutsch et al. .......... 73/114.45 |
| 7,426,099 | B2 * | 9/2008 | Soudier et al. .............. 361/23 |
| 7,505,847 | B2 * | 3/2009 | Burkatovsky ............... 701/114 |
| 2007/0067092 | A1 * | 3/2007 | Burkatovsky ............... 701/114 |
| 2007/0219749 | A1 * | 9/2007 | Jayabalan et al. ........... 702/182 |
| 2008/0316670 | A1 * | 12/2008 | Matsuura .................... 361/152 |

* cited by examiner

Primary Examiner—Erick Solis

(57) ABSTRACT

An engine control system includes a driver module and a diagnostics module. The driver module includes a high-side driver and a low-side driver, which selectively actuate a load. The driver module generates status signals based on detection of each of a plurality of failure modes of the high-side and low-side drivers. The diagnostics module increments a first error count for a first mode of the plurality of failure modes when the status signals indicate the driver module has detected the first mode. The diagnostics module increments a corresponding total count each time the driver module analyzes the first mode. The diagnostics module sets a fail state for a diagnostic trouble code (DTC) when the first error count for the first mode reaches a first predetermined threshold prior to the total count reaching a second predetermined threshold.

20 Claims, 4 Drawing Sheets

| | HSO Open | HSO Short to Ground | HSO Short to Power | LSO Open | LSO Short to Ground | LSO Short to Power | Short Between HSO / LSO |
|---|---|---|---|---|---|---|---|
| Injector A | X , Y | X , Y | X , Y | 40 , 40 | X , Y | X , Y | X , Y |
| Injector B | X , Y | X , Y | X , Y | X , Y | X , Y | X , Y | X , Y |
| Injector C | X , Y | X , Y | X , Y | 40 , 100 | X , Y | X , Y | X , Y |
| Injector D | X , Y | X , Y | X , Y | X , Y | X , Y | X , Y | X , Y |
| Injector E | X , Y | X , Y | X , Y | 10 , 50 | X , Y | X , Y | X , Y |
| Injector F | X , Y | X , Y | X , Y | X , Y | X , Y | X , Y | X , Y |
| Pump Solenoid | X , Y | X , Y | X , Y | X , Y | X , Y | X , Y | X , Y |

DIAGNOSTIC SYSTEM FOR SPARK IGNITION DIRECT INJECTION SYSTEM CONTROL CIRCUITS

FIELD

The present disclosure relates to fuel injection systems and more particularly to improved diagnostic systems and methods for detecting fuel injection system failures.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a spark ignition direct injection (SIDI) system, highly pressurized fuel is injected via a common fuel rail directly into a combustion chamber of each cylinder in an engine. The SIDI design may provide a more efficient distribution of an air/fuel mixture in the cylinders than conventional multi-port fuel injection, which injects fuel near intake ports of the cylinders. More efficient air/fuel distribution may provide improved fuel efficiency, higher power output, and reduced emission levels at low load conditions.

An onboard diagnostic (OBD) system monitors the individual components of the SIDI system and records errors detected with any of the individual components. Diagnostic trouble codes (DTCs) for various errors and malfunctions may be predefined by standards, such as second generation OBD (OBD-II). DTCs set by the OBD system may be read by service tools owned by dealerships and/or repair facilities. The OBD system may also notify an operator of the vehicle when one or more DTCs have been set.

SUMMARY

An engine control system includes a driver module and a diagnostics module. The driver module includes a high-side driver and a low-side driver. The high-side and low-side drivers selectively actuate a load. The driver module analyzes a plurality of failure modes of the high-side and low-side drivers. The driver module generates status signals based on detection of each of the plurality of failure modes. The diagnostics module stores a first error count for each of the plurality of failure modes and stores a total count. The diagnostics module increments the first error count for a first mode of the plurality of failure modes when the status signals indicate the driver module has detected the first mode. The diagnostics module increments the total count each time the driver module analyzes the first mode. The diagnostics module sets a fail state for a diagnostic trouble code (DTC) when the first error count for the first mode reaches a first predetermined threshold prior to the total count reaching a second predetermined threshold.

A method includes selectively actuating a load using a high-side driver and a low-side driver; analyzing a plurality of failure modes of the high-side and low-side drivers; generating status signals based on detection of each of the plurality of failure modes; storing a first error count for each of the plurality of failure modes; storing a total count for each of the plurality of failure modes; incrementing the first error count for a first mode of the plurality of failure modes when the status signals indicate that the first mode has been detected; incrementing the total count for the first mode each time the status signals indicated that the first mode has been analyzed; and setting a fail state for a diagnostic trouble code (DTC) when the first error count for the first mode reaches a first predetermined threshold prior to the total count reaching a second predetermined threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
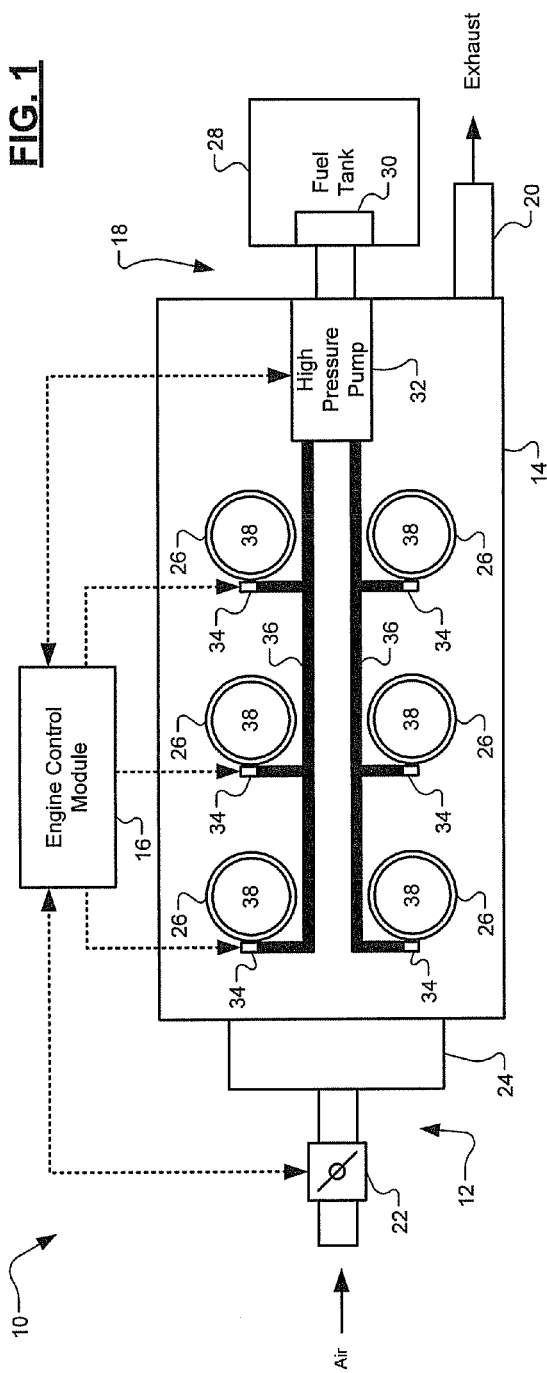
FIG. 1 is a functional block diagram illustrating an exemplary vehicle power system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of a vehicle power system 10 is shown. The power system 10 includes an intake system 12, an engine 14, an engine control module (ECM) 16, a spark ignition direct injection (SIDI) fuel system 18, and an exhaust system 20. In the intake system 12, air passing through a throttle valve 22 is drawn into an intake manifold 24. Based on signals from the ECM 16, the throttle valve 22 regulates the volume of air drawn into the intake manifold 24.

The intake manifold 24 distributes the air to N combustion chambers 26 located in the engine 14. Although FIG. 1 depicts the engine 14 having six combustion chambers 26

(N=6), the engine 14 may include additional or fewer chambers 26. For example only, the engine 14 may include from 1 to 16 chambers. The functions of the ECM 16 can be incorporated with functions of a transmission control module (not shown) into a single powertrain control module.

The air in the combustion chambers 26 combusts with a metered amount of fuel supplied directly to the combustion chambers 26 by the SIDI fuel system 18. In the SIDI fuel system 18, fuel from a fuel tank 28 is pumped to a first pressure (e.g., 0.3-0.6 MegaPascals) by a low pressure pump 30.

The low pressure pump 30 provides the fuel to a high pressure pump 32 that pumps the fuel to a second pressure (e.g., 2-26 MegaPascals). The fuel pressurized to the second pressure is provided to fuel injectors 34 via fuel rails 36 for injection into the combustion chambers 26. The ECM 16 may vary the output of the fuel injectors 34 to optimize performance of the engine 14. For example, the ECM 16 may decrease the amount of fuel injected (leaner air/fuel ratio) at light-load conditions to lower exhaust emission levels.

Conversely, in a full power mode (e.g., during rapid acceleration or with heavy loads), the ECM 16 may increase the amount of fuel injected (richer air/fuel ratio) to optimize engine performance. While the SIDI fuel system 18 is shown with the single high pressure pump 32 supplying the fuel rails 36, the SIDI fuel system 18 may include any combination of fuel pumps and fuel rails to supply fuel to the fuel injectors 34. For example, in applications having high fuel demands, one or more dedicated fuel pumps may be implemented for each rail in a multiple rail system. The combustion of the air/fuel mixture reciprocally drives pistons 38 located within the combustion chambers 26 to drive a crankshaft. Power from the crankshaft is used to propel the vehicle. Waste exhaust gases from the combustion process are conveyed away from the engine 14 through the exhaust system 20.

Figure 2:
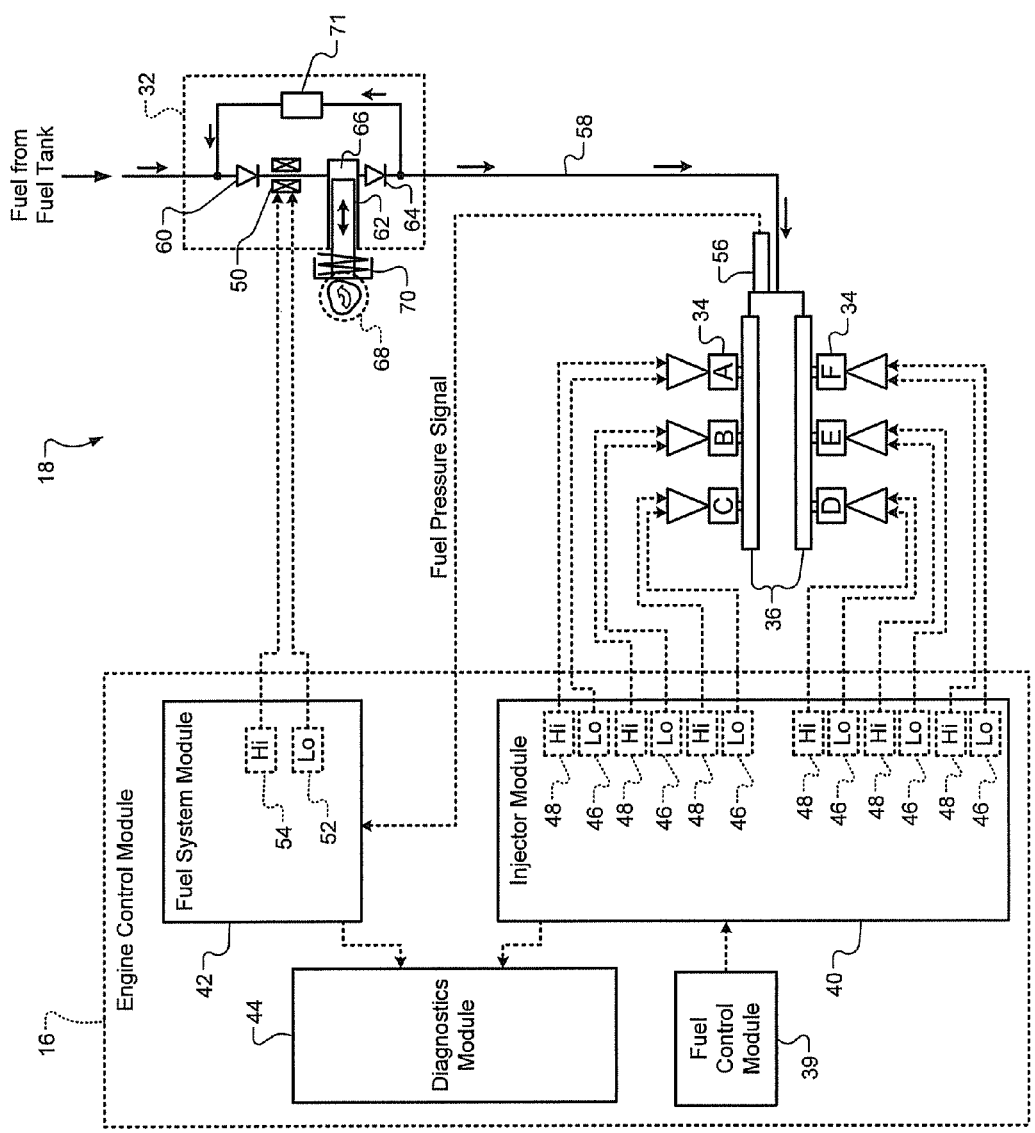
FIG. 2 is a schematic diagram illustrating an exemplary engine control system of the vehicle power system according to the principles of the present disclosure.

Referring now to FIG. 2, a functional block diagram of the engine control module (ECM) 16 is shown including a fuel control module 39, an injector module 40, a fuel system module 42, and a diagnostics module 44. The fuel control module 39 determines a desired air/fuel ratio corresponding to the desired performance characteristics. The fuel control module 39 converts the desired air/fuel ratio into a desired fuel mass. The injector module 40 controls the amount of fuel injected by the fuel injectors 34 to achieve the desired fuel mass.

The injector module 40 may control the amount of fuel injected by controlling the amount of time that the fuel injectors 34 are open. With a constant fuel pressure in the fuel rails 36, the time that the fuel injectors 34 are open determines the amount of fuel injected. The fuel system module 42 maintains the fuel pressure in the fuel rails 36 at an approximately constant level. For example only, fuel system module 42 may maintain the fuel pressure to within a predetermined percentage of a desired fuel pressure.

Each of the fuel injectors 34 may include a low side and a high side input. The injector module 40 may therefore include a low-side driver 46 and a high-side driver 48 corresponding to each of the fuel injectors 34. The drivers 46, 48 may be switched "ON" and "OFF" using pulse-width modulation (PWM). In various implementations, the injector module 40 may control the duty cycle of the PWM signals to achieve the desired fuel mass.

The fuel system module 42 controls a solenoid 50 in the high pressure pump 32 using a low-side driver 52 and a high-side driver 54. The fuel system module 42 receives feedback from a fuel rail sensor 56 indicating the fuel pressure in the fuel rail 36. The drivers 52, 54 are switched "ON" and "OFF" to open or close the solenoid 50 to allow fuel to flow from the low pressure pump 30 of FIG. 1 to a fuel line 58.

The high pressure pump 32 may include a piston-style pump that includes a first check valve 60, a piston 62, and a second check valve 64. An end of the piston 62 is located in a chamber 66. A cam 68 presses the piston 62 from a first position to a second position, which decreases the volume of the chamber 66. Any fuel in the chamber 66 is therefore pushed through the second check valve 64 into the fuel line 58. For example only, the cam 68 may be rotated by a valvetrain camshaft (not shown) or by an electric motor (not shown).

The piston 62 is returned to the second position by a device such as a spring 70. This increases the volume in the chamber 66, thereby lowering the pressure. When the solenoid 50 is open, the pressure differential in the chamber 66 results in fuel flowing into the chamber from the first check valve 60. A mechanical relief valve 71 may allow fuel to flow from the fuel line 58 to the low pressure side of the high pressure pump 32 when pressure in the fuel line 58 increases above a threshold. In various implementations, the fuel system module 42 may synchronize the opening and closing of the solenoid 50 with the position of the cam 68.

Figure 3:
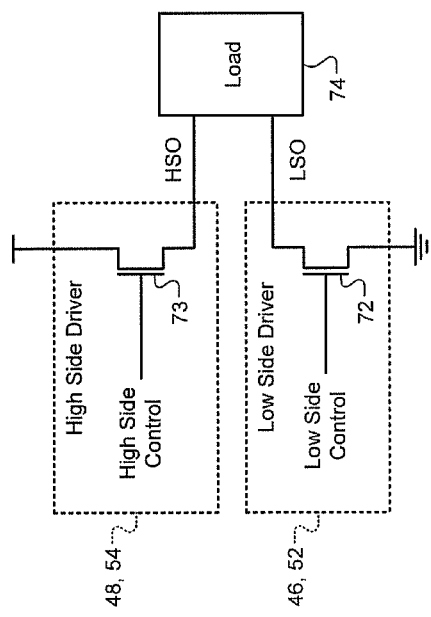
FIG. 3 is a schematic diagram illustrating an exemplary implementation of the injector/fuel system module of the engine control module of FIG. 2 according to the principles of the present disclosure.

Referring now to FIG. 3, a schematic diagram of an exemplary implementation of the drivers 46, 48, 52, 54 is shown. In the low-side driver 46, 52, a switch 72 selectively allows current to flow from a load 74 to a low potential, such as ground or 12 V. In the high-side driver 48, 54, a switch 73 selectively allows current to flow from a power supply to the load 74. In various implementations, a voltage of the power supply may be varied, such as by selecting one of two power supply voltages. In various implementations, the two power supply voltages may be 12 V and 65 V. In various implementations, the switches 72 and 73 may be solid-state switches, such as metal-oxide semiconductor field-effect transistors (MOSFETs).

The load 74 connects to the high-side driver 48, 54 via a high-side output (HSO) and connects to the low-side driver 46, 52 via a low-side output (LSO). The load 74 is driven by both the high-side driver 48, 54 and the low-side driver 46, 52 to allow for high sped switching. Potential failure modes for the high-side drivers 48, 54 include the HSO being open (disconnected), the HSO being shorted to the ground potential, and the HSO being shorted to the power supply. Similarly, failure modes for the low-side drivers 46, 52 include the LSO being open, shorted to the ground potential, and shorted to the power supply. A further failure mode includes a short circuit between the HSO and the LSO inside the load 74. Therefore, each pair of high and low-side drivers may evidence at least seven failure modes.

Figures 4A, 4B:
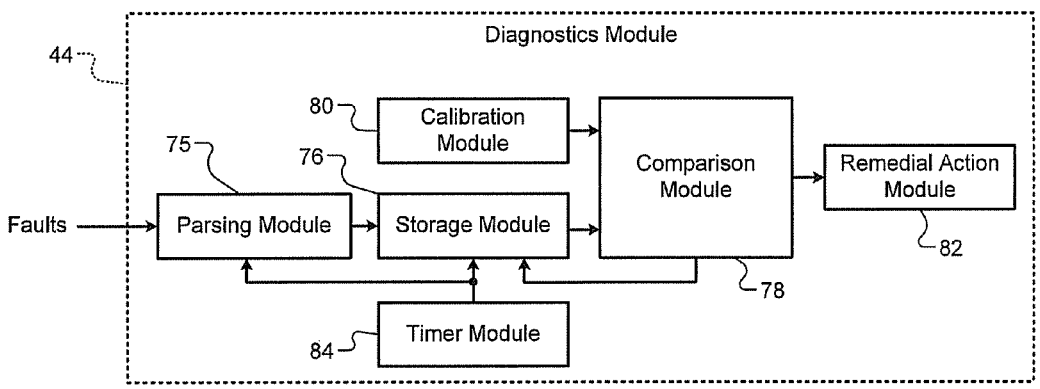
FIG. 4A is a schematic diagram illustrating an exemplary implementation of the diagnostics module of the engine control module of FIG. 2 according to the principles of the present disclosure.
FIG. 4B is a diagram illustrating exemplary data stored in the storage module of FIG. 4A according to the principles of the present disclosure.

Referring now to FIG. 4A, an exemplary implementation of the diagnostics module 44 is shown. The injector module 40 determines when one of the above failure modes is present in any of the low-side drivers 46 or the high-side drivers 48. The fuel system module 42 determines when one of the above failure modes is present in the low-side driver 52 or the high-side driver 54. For example only, the injector module 40 may measure currents and/or voltages at various locations of the low-side driver 46 and the high-side driver 48 of one of the fuel injectors 34 in order to detect various failure modes.

The diagnostics module 44 records data pertaining to the detected failure modes, analyzes the recorded data, and makes PASS/FAIL decisions based on the analysis. For example only, the diagnostics module 44 includes a parsing module 75, a storage module 76, a comparison module 78, a calibration module 80, a remedial action module 82, and a timer module 84. The parsing module 75 receives status signals from the injector module 40 and the fuel system module 42 indicating which failures have been detected and/or whether no failures have been detected.

For example only, seven failure modes may be defined for each low/high-side driver pair, as described above and shown in FIG. 4B. Although seven failure modes are shown, some or all of the low/high-side driver pairs may have more or fewer failure modes defined. When six fuel injectors 34 are present, such as for a six-cylinder engine, and a pump solenoid is controlled with a low/high-side driver pair, there are 7 total low/high-side driver pairs. Therefore, 49 failure modes may be recorded–7 failure modes for each of the 7 driver pairs.

Referring now to FIG. 4B, an exemplary storage table 86 stored in the storage module 76 is shown. Each storage location of the storage table 86 may correspond to one of the failure modes being detected for one of the low/high-side driver pairs. Each storage location may include two values, named X and Y. The X value tracks the number of times a failure mode was detected, while the Y value tracks the total number of detection cycles. In other implementations, each storage location includes an X value, while one or more common Y values are stored. For example, a single Y value may be stored for the entire storage table 86. Alternatively, different Y values may be stored for each failure mode, with each Y value being common across all of the low/high-side driver pairs for that failure mode.

In various implementations, whether a given failure mode is present for a given low/high-side driver pair may be determined periodically, such as every 12.5 ms, every 62.5 ms, or every 100 ms. The period between determinations may be different for each low/high-side driver pair and each failure mode. For purposes of illustration, refer to a storage location 88 for a failure mode of the low side output (LSO) being open for fuel injector C. The values in storage location 88 indicate that 40 faults have been detected (X=40) in 100 detection cycles (Y=100). In other words, the LSO open failure mode was detected in 40% of the 100 detection cycles. Shown as further illustration, injector A had an LSO open failure mode for 100% of the last 40 detection cycles, while injector E had an LSO open failure mode for 20% of the last 50 detection cycles.

Referring back to FIG. 4A, the timer module 84 may determine how often failure mode data is read by the parsing module 75. The timer module 84 may provide different timing signals for different failure modes depending on how often checks are performed for presence of the respective failure modes. Each time the parsing module 75 receives an indication of whether or not a failure mode is present, the parsing module 75 increments the Y value in the corresponding storage location of the storage module 76. If the failure mode was present, the parsing module 75 increments the X value in the corresponding storage location of the storage module 76.

The comparison module 78 analyzes the data stored in the storage module 76. For example only, the comparison module 78 may compare the X and Y values of each storage location to predetermined thresholds. These thresholds may be stored in a calibration module 80 and may be set independently for each failure mode and each low/high-side driver pair. In various implementations, the thresholds for a given failure mode may be set equal for all low/high-side driver pairs.

For example only, a selected storage location may have a first predetermined threshold for the X value and a second predetermined threshold for the Y value. When the Y value of a storage location reaches the second predetermined threshold, the comparison module 78 may reset the X and Y values in the storage location to 0. However, when the Y value has not yet reached the second predetermined threshold but the X value reaches the first predetermined threshold, the comparison module 78 may set a diagnostic trouble code (DTC). The DTC is transmitted to the remedial action module 82.

As an illustration, consider a case where the first predetermined threshold is 40 and the second predetermined threshold is 100. This corresponds to a 40% threshold, above which a DTC will be set. If the Y value reaches 100 before the X value reaches 40, the percentage of failure mode detection will be less than 40%. The DTC is set to a pass state, and both X and Y are reset for another series of measurements. However, if the X values reaches 40 at any time up to and including when the Y value reaches 100, the percentage of failure mode detection is 40% or greater. The DTC is set to a fail state, and both X and Y are reset for another series of measurements.

Separate DTCs may be assigned to each failure mode for each low/high-side driver pair. The remedial action module 82 may record the total number of each DTC generated by the comparison module 78. The remedial action module 82 may also record information about when the DTCs were generated. The remedial action module 82 may provide this stored information to diagnostic devices, such as OBD-II scan tools.

Further, the remedial action module 82 may provide feedback to an operator of the vehicle, such as by illuminating an indicator light or outputting a message to a display. Further, the remedial action module 82 may instruct vehicle systems to perform various remedial actions. For example only, the remedial actions selected may be based on which type and how many of the DTCs are received.

The remedial action module 82 may reduce the upper limit of power output of the engine. The remedial action module 82 may reduce the maximum allowed air/fuel mixture richness (equivalent to increasing the lower limit on air/fuel ratio). The remedial action module 82 may limit the opening of the throttle valve 22 to a range of positions or to a predetermined position. The remedial action module 82 may halt the provision of fuel to one or more cylinders 38. The remedial action module 82 may shutdown the engine 14, which may include halting provision of fuel to all of the cylinders 38 and/or stopping the provision of spark to all of the cylinders 38.

Figure 5:
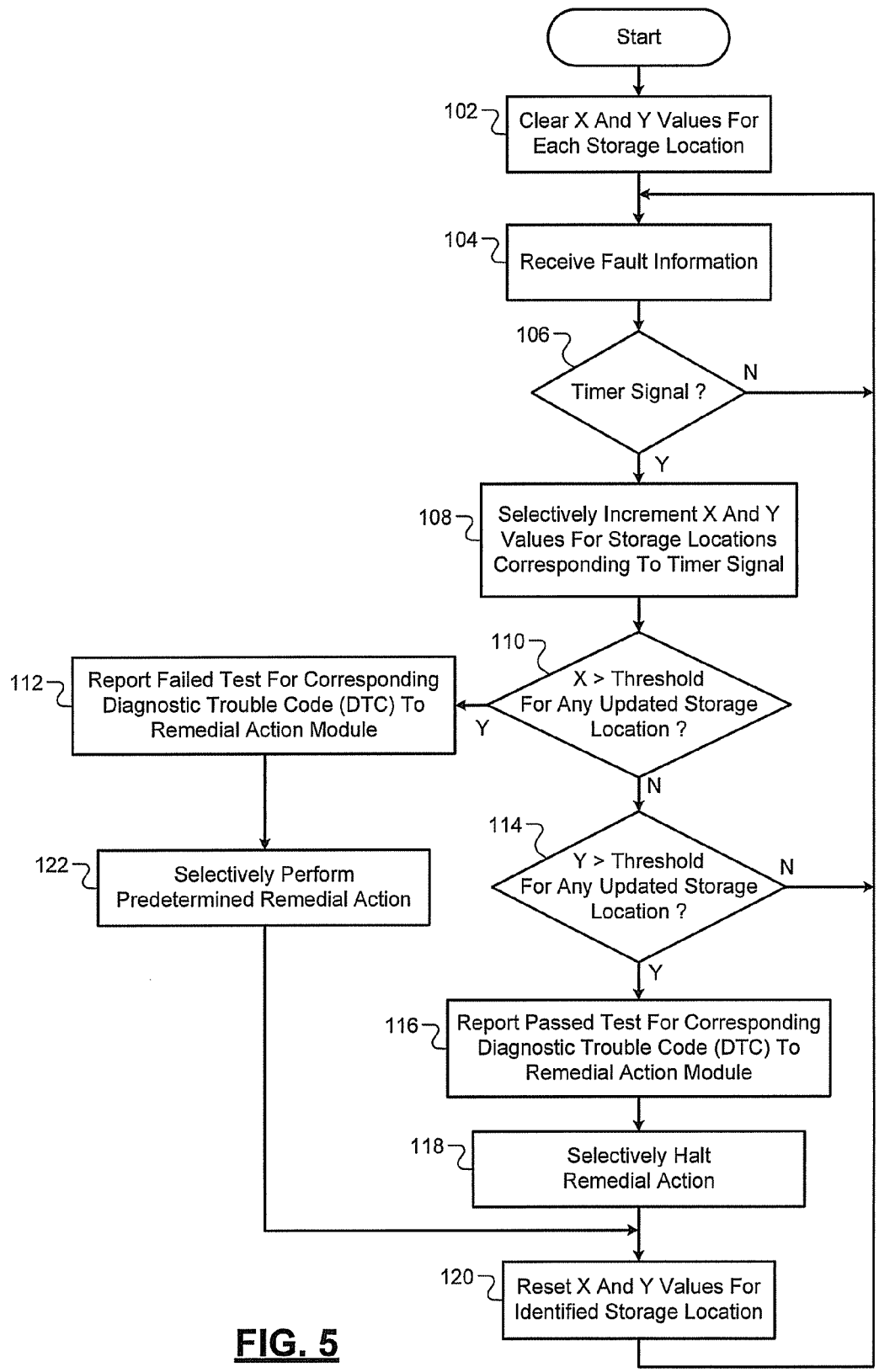
FIG. 5 is a flowchart of an exemplary implementation of the diagnostics module according to the present disclosure.

Referring now to FIG. 5, a flowchart depicts exemplary operation of the diagnostics module 44 of FIG. 4A. Control may begin when the engine 14 is started. Control begins in step 102, where control clears the X and Y values for each of the storage locations in the storage module 76. Control continues in step 104, where control receives fault information from the fuel system module 42 and the injector module 40.

Control continues in step 106, where control determines whether a timer signal has been generated by the timer module 84. If so, control transfers to step 108; otherwise, control returns to step 104. The timer signal received in step 106 may correspond to one or more of the storage locations of the storage module 76.

For example only, all failure modes for all low/high-side driver pairs are determined on a common periodic schedule. In this case, the timer signal in step 106 indicates that the X and Y values will be updated for all storage locations in the storage module 76. Alternatively, the timer signal may apply to only certain failure modes. For example only, failure modes that are tested more frequently may correspond to a timer signal that is generated more often. For example only, shorts to ground and to power may be tested more frequently than open failure modes.

In step 108, control selectively increments X and Y values for storage locations that correspond to the timer signal generated in step 106. The Y values for each of the storage locations may be incremented regardless of whether a fault was detected, while the X values may be incremented when the corresponding failure mode of the corresponding low/high-side driver pair is detected.

Control continues in step 110, where control determines whether an X value of any of the updated storage locations is greater than a corresponding predetermined threshold. If the X value exceeds the corresponding threshold for one or more of the storage locations, control transfers to step 112; otherwise, control transfers to step 114.

The predetermined threshold may be stored by a calibration module 80. As described above, the thresholds may be different depending on the failure mode and the low/high-side driver pair to which the storage location applies. In various implementations, the calibration module 80 may include a table similar to the storage table 86, where the X and Y values in each storage location indicate the X and Y thresholds to apply to the storage table 86.

In step 114, control determines whether the Y value for any of the storage locations updated in step 108 is greater than a corresponding predetermined threshold. If so, control transfers to step 116; otherwise, control returns to step 104. The Y thresholds may also be stored by the calibration module 80. In various implementations, the inequality in steps 110 and 114 may be a greater than or equal to ($\geq$) instead of the greater than ($>$). In step 116, control reports a pass state for a diagnostic trouble code (DTC) to the remedial action module 82. The DTC corresponds to the storage location identified in step 114 for which the Y value is greater than the predetermined threshold.

Control continues in step 118, where remedial action is selectively halted. For example, if remedial action had been initiated based on the DTC that now has a pass state, the remedial action may be halted. Alternatively, the previous remedial action may be made less restrictive. For example only, an upper torque limit may be increased when the DTC previously having a fail state now has the pass state. Control continues in step 120, control resets the X and Y values for the identified storage location and control returns to step 104.

In step 112, control reports a fail state for a diagnostic trouble code (DTC) to the remedial action module 82. The DTC corresponds to the storage location identified in step 110 for which the X value is greater than the predetermined threshold. When multiple storage locations meet the criteria in step 110, multiple fail state DTCs may be reported to the remedial action module step 112. Distinct DTCs may be defined for each storage location in the storage table 86.

Control continues in step 122, where control selectively performs predetermined remedial actions based upon the DTCs sent in step 112. Whether remedial action is performed and which remedial action or actions will be performed in step 122 may further be determined by previous DTC information.

For example only, a first DTC for a first low/high-side driver pair corresponding to a first fuel injector, where the failure mode is a low-side output (LSO) open failure, may be logged for retrieval by a service technician. However, additional instances of the same DTC may trigger deactivation of the first fuel injector. Deactivating the fuel injector may include deactivating the associated cylinder and any other fuel injectors serving the associated cylinder.

For example only, the selected remedial action may include shutting down the engine 14 when a summation of DTCs across multiple fuel injectors is greater than a threshold number. After performing and/or initiating the predetermined remedial action, control continues in step 120, where the X and Y values for the storage locations identified in step 110 are reset.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
a driver module that includes a high-side driver and a low-side driver, wherein the high-side and low-side drivers selectively actuate a load, wherein the driver module analyzes a plurality of failure modes of the high-side and low-side drivers, and wherein the driver module generates status signals based on detection of each of the plurality of failure modes; and
a diagnostics module that stores a first error count for each of the plurality of failure modes and that stores a total count, wherein the diagnostics module increments the first error count for a first mode of the plurality of failure modes when the status signals indicate that the driver module has detected the first mode, wherein the diagnostics module increments the total count each time the driver module analyzes the first mode, and wherein the diagnostics module sets a fail state for a diagnostic trouble code (DTC) when the first error count for the first mode reaches a first predetermined threshold prior to the total count reaching a second predetermined threshold.

2. The engine control system of claim 1 wherein the load comprises a fuel injector and wherein the high-side and low-side drivers selectively actuate the load based on a desired fuel mass.

3. The engine control system of claim 1 wherein the load comprises a solenoid that is implemented in a fuel pump, and wherein the high-side and low-side drivers selectively actuate the load based on a desired fuel pressure.

4. The engine control system of claim 1 further comprising a plurality of driver pairs, wherein each driver pair includes a low-side driver and a high-side driver, and wherein the diagnostics module stores an error count for each of the plurality of failure modes for each of the plurality of driver pairs.

5. The engine control system of claim 4 wherein each of the plurality of driver pairs actuates a fuel injector, wherein the load comprises a solenoid that is implemented in a fuel pump, and wherein the high-side and low-side drivers selectively actuate the load based on a desired fuel pressure.

6. The engine control system of claim 4 wherein the diagnostics module selectively sets the fail state for a distinct DTC for each of the plurality of failure modes for each of the plurality of driver pairs.

7. The engine control system of claim 1 wherein the diagnostics module selectively sets the fail state for a distinct DTC for each of the plurality of failure modes.

8. The engine control system of claim 1 wherein the diagnostics module stores a plurality of total counts including the total count, wherein each of the plurality of total counts corresponds to one of the plurality of failure modes.

9. The engine control system of claim 8 wherein the diagnostics module stores a plurality of first predetermined thresholds including the first predetermined threshold and stores a plurality of second predetermined thresholds including the second predetermined threshold, wherein each of the plurality of first predetermined thresholds corresponds to one of the plurality of failure modes, and wherein each of the plurality of second predetermined thresholds corresponds to one of the plurality of failure modes.

10. The engine control system of claim 1 wherein the diagnostics module selectively performs remedial action based on the state of the DTC.

11. A method comprising:
selectively actuating a load using a high-side driver and a low-side driver;
analyzing a plurality of failure modes of the high-side and low-side drivers;
generating status signals based on detection of each of the plurality of failure modes;
storing a first error count for each of the plurality of failure modes;
storing a total count for each of the plurality of failure modes;
incrementing the first error count for a first mode of the plurality of failure modes when the status signals indicate that the first mode has been detected;
incrementing the total count for the first mode each time the status signals indicated that the first mode has been analyzed; and
setting a fail state for a diagnostic trouble code (DTC) when the first error count for the first mode reaches a first predetermined threshold prior to the total count reaching a second predetermined threshold.

12. The method of claim 11 wherein the load comprises a fuel injector and further comprising selectively actuating the load using the high-side and low-side drivers based on a desired fuel mass.

13. The method of claim 11 wherein the load comprises a solenoid that is implemented in a fuel pump, and further comprising selectively actuating the load using the high-side and low-side drivers based on a desired fuel pressure.

14. The method of claim 11 further comprising:
selectively actuating a plurality of loads using a plurality of driver pairs, wherein each driver pair includes a low-side driver and a high-side driver; and
storing an error count for each of the plurality of failure modes for each of the plurality of driver pairs.

15. The method of claim 14 wherein each of the plurality of driver pairs actuates a fuel injector, wherein the load comprises a solenoid that is implemented in a fuel pump, and further comprising selectively actuating the load using the high-side and low-side drivers based on a desired fuel pressure.

16. The method of claim 14 further comprising selectively setting the fail state for a distinct DTC for each of the plurality of failure modes for each of the plurality of driver pairs.

17. The method of claim 11 further comprising selectively setting the fail state for a distinct DTC for each of the plurality of failure modes.

18. The method of claim 11 further comprising storing a plurality of total counts including the total count, wherein each of the plurality of total counts corresponds to one of the plurality of failure modes.

19. The method of claim 18 further comprising:
storing a plurality of first predetermined thresholds including the first predetermined threshold; and
storing a plurality of second predetermined thresholds including the second predetermined threshold, wherein each of the plurality of first predetermined thresholds corresponds to one of the plurality of failure modes, and wherein each of the plurality of second predetermined thresholds corresponds to one of the plurality of failure modes.

20. The method of claim 11 further comprising selectively performing remedial action based on the state of the DTC.

* * * * *